March 28, 1950     B. C. MUZZEY     2,502,059
SHEET THICKNESS GAUGE
Filed Feb. 4, 1947     3 Sheets-Sheet 1

INVENTOR.
Benjamin C. Muzzey
BY
Spencer, Hardman & Fehr
HIS ATTORNEYS

March 28, 1950  B. C. MUZZEY  2,502,059
SHEET THICKNESS GAUGE
Filed Feb. 4, 1947  3 Sheets-Sheet 2

INVENTOR.
Benjamin C. Muzzey
BY
Spencer, Hardman & Fehr
His ATTORNEYS

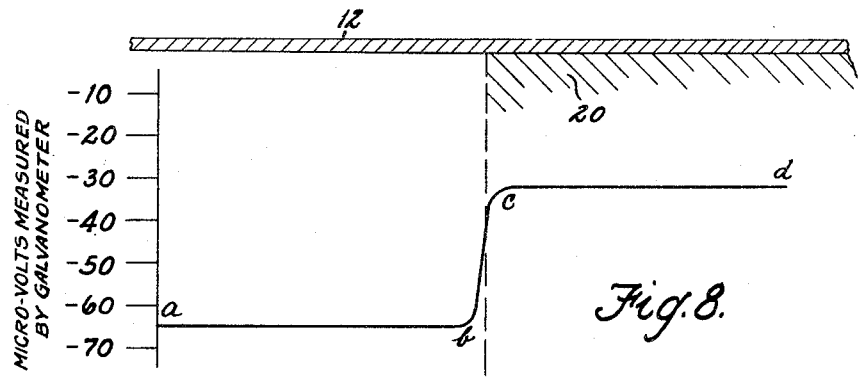
Fig. 8.
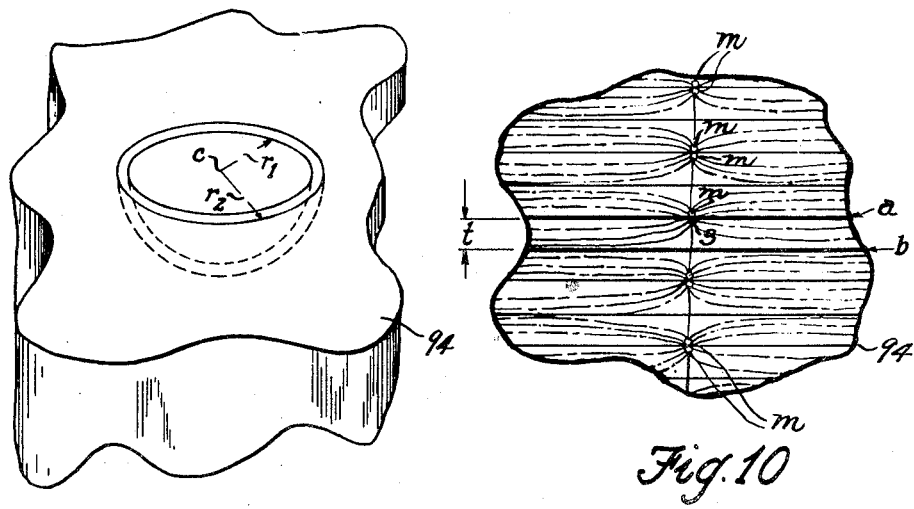
Fig. 9.
Fig. 10
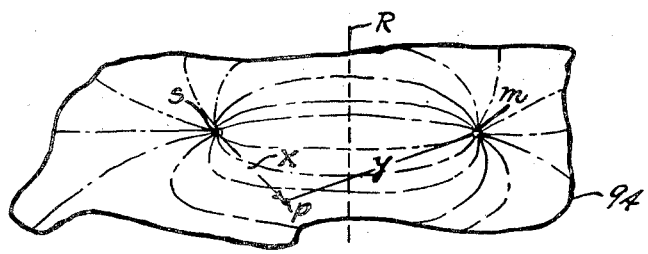
Fig. 11.
INVENTOR.
Benjamin C. Muzzey
BY
Spencer, Hardman & Fehr
His ATTORNEYS Patented Mar. 28, 1950

2,502,059

UNITED STATES PATENT OFFICE 2,502,059

SHEET THICKNESS GAUGE

Benjamin C. Muzzey, Lexington, Mass., assignor to General Motors Corporation, Detroit, Mich., a corporation of Delaware Application February 4, 1947, Serial No. 726,287

8 Claims. (Cl. 175—183)

This invention relates to a system and means for practicing a method for detecting and plotting changes in section of a metallic body.

More specifically the invention relates to the detection and location of irregularities in metal sheets or plate-like members, and metal bodies fabricated from such members, such as the blades or parts of blades used in aircraft propellers.

One object of the invention is to measure the exact thickness of elements of propeller blades whether assembled with other parts or in separate pieces or in stock form.

Another object of the invention is to measure the wall thickness of anything made from a current carrying material.

Another object of the invention is to measure the wall thickness of anything made from a current conducting material by application to one surface thereof when the other side thereof is inaccessible, and whether the surface is flat or curved.

Yet another object of the invention is to measure the wall thickness of a member at any point thereon, whether the point be close to a bounding edge of the work, or close to an abrupt change of section, and to measure such member without the need for recalibration of the instrument.

Still another object of the invention is to provide a method and means for critical examination of a composited metal structure, such as a hollow metal propeller blade, after it has been manufactured and is ready for installation upon, or even after it has been installed upon an aircraft.

Further objects and advantages of the present invention will be apparent from the following description, reference being had to the accompanying drawings wherein a preferred embodiment of the present invention is clearly shown.

In the drawings:

Fig. 8 is a composite view of a fragment of metal sheet joined to another body of abrupt section, with an associated curve of measurements made by the instrument, such as might occur in moving the instrument transverse of the blade shown in Fig. 1.

Figs. 9, 10, and 11 are explanatory views for illustrating the principle of operation of the instant invention.

The manufacturer of propeller blades is burdened with the problem of rendering an element of structure that is relatively faultless in construction, and that very closely matches the characteristics of a master or model construction. Slight variations in the construction of one blade of those used in a set on the same hub may be the cause of the wreck of the craft on which the propeller is mounted. Aside from the great cost of the craft that may be lost, there is the contigency of loss of human life. A blade that has cracks or flaws may be the prime cause for tearing a power plant from the craft and rendering the craft beyond control. An internal flaw in the metal may permit a crack to develop which grows into a serious rupture. Any condition of the blade that tends to change its reaction relative to associated blades is dangerous, and should be tracked down before human life is lost and great moneyed investment is placed upon the blade.

The present invention accomplishes that end and attains the stated objects, as well as others that will be subsequently developed, by passing a given current through the root of the blade and taking it off through a movable electrode located in a pickup instrument, having spring loaded contact members suitably disposed so as to effect measurement of the potential drop through known current patterns by a galvanometer connected with the contacts. Movement of the instrument over the metallic member being inspected will give an indication of change in section of the metal being inspected. By proper calibration and manipulation it is possible to detect and exactly plot any change in the thickness of any wall in a hollow metal blade or similar article.

Specific usage of the system and means for measurement of sheet thickness will be detection of any change in section of the hollow blade walls, given rise to by variations in thickness due to dents, bumps, low spots, high spots, and internal voids or cracks. In each instance of usage there is detection of any change in metal section that will effect a variation in potential reading on the galvanometer. The character and amount of galvanometer change indication can be interpreted in the character and extent of the fault being detected.

Figure 1:
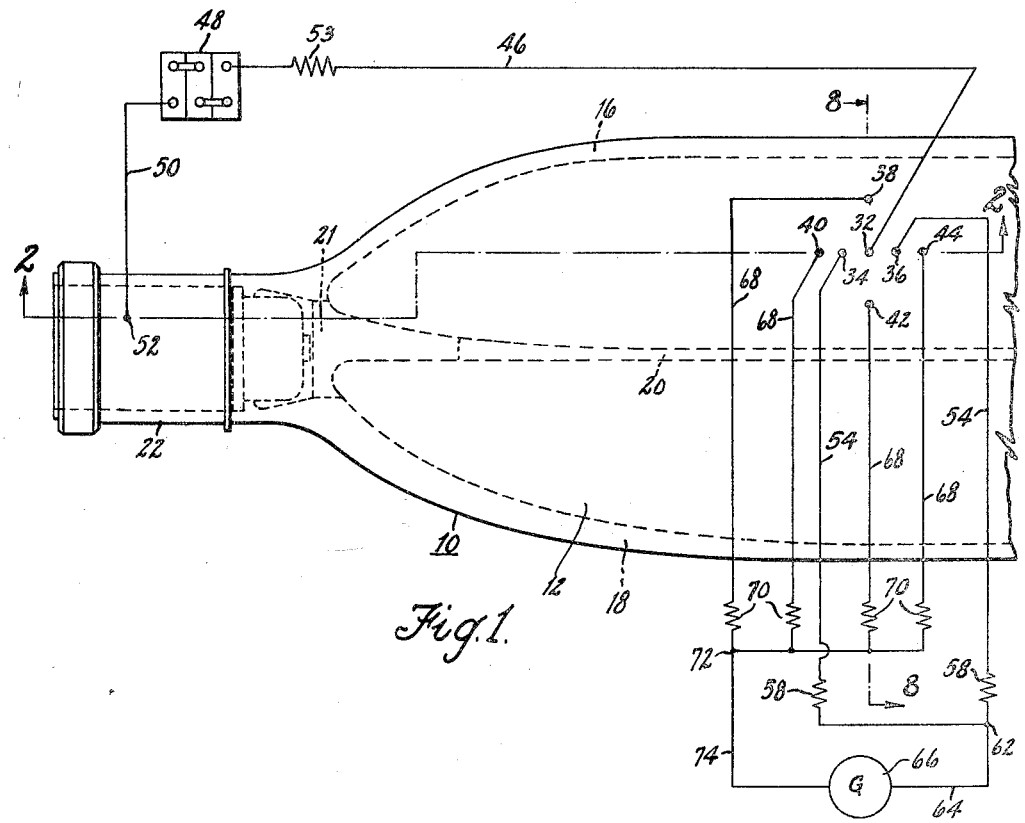
Fig. 1 shows the metallic structure in plan view with a circuit indication of the means and method for examination of a completed metallic article.
Figure 2:
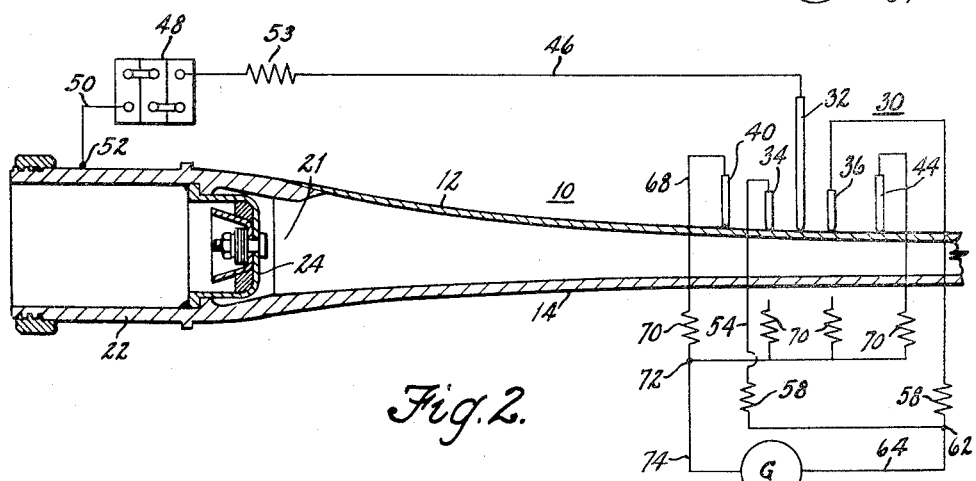
Fig. 2 is a similar view but showing the metallic article sectioned somewhat as indicated by the line and arrows 2—2 of Fig. 1.

Making particular reference to the drawings, and first with respect to Figs. 1 and 2, 10 refers to a propeller blade made up from a formed sheet metal member 12 secured to a forged thrust member 14, that has peripheral edges 16 and 18 and a mid rib 20 upstanding therefrom, and the surfaces of which are bonded to one side of the sheet 12 all as described in Blanchard 2,205,132. The major portion of the blade so fabricated is paddle like, flat and hollow, which opens through a restriction 21 into a hollow shank 22, except for a blade-balance assembly 24 stopping off the chamber in a hermetically sealed manner. The blade being sealed, or the interior being inaccessible only through the restricted opening, any testing that is contemplated must be done from the outside. The measuring means disclosed affords an effective method for making all of the tests and measurements on any part of the completed blade that is desired. The means for the method contemplates a pickup instrument 30 Figs. 3 and 4 having a plurality of electrical contacts 32, 34, 36, 38, 40, 42 and 44, connected severally into an energizing circuit and into an instrument circuit. The contact 32 is in the energizing circuit and connects with a lead 46 connecting with a source of current such as a battery 48 that in turn provides a lead 50 connecting with the blade shank 22 at some remote point as at 52. A current limiting resistance 53 in series with the battery may be used if desired. Contacts 34 and 36 are in one side of the instrument circuit and each connects with a lead 54, and resistances 58, after which they join at 62 and lead by conductor 64 to one side of a galvanometer 66. Contacts 38, 40, 42 and 44 are in the other side of the instrument circuit and each connects with leads 68 and resistors 70 respectively, after which they join at 72 with a common conductor 74 connected with the other side of the galvanometer 66.

Figure 3:
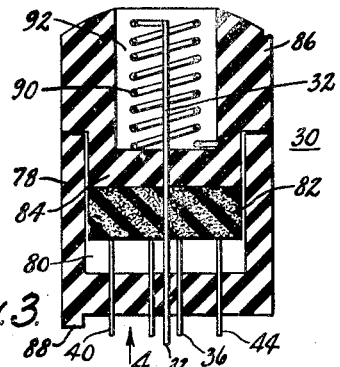
Fig. 3 is a sectional view thru a pickup instrument showing the features of yieldable contact engagement.
Figure 4:
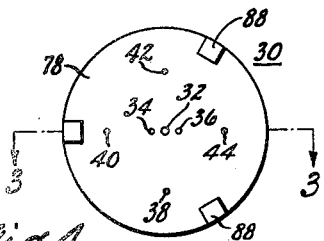
Fig. 4 is a bottom plan view of the pickup device illustrating the arrangement of the contact prods, it being a view somewhat as indicated by the arrow 4 in Fig. 3.
Figure 7:
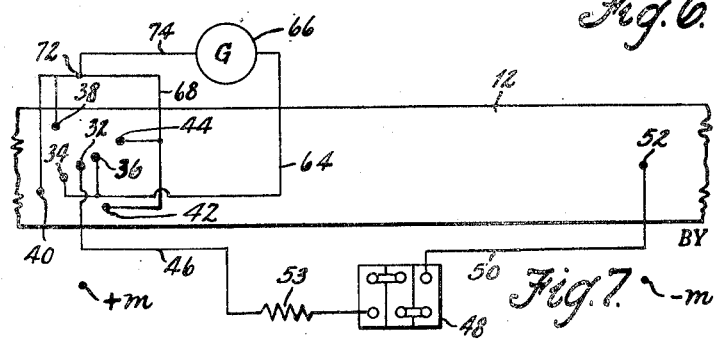
Fig. 7 is a schematic view illustrating other considerations of the improved thickness measuring instrument and method.

Referring to Figs. 3 and 4, each of the contacts of the pickup are slidably mounted and resiliently supported in an insulating body 78 that properly spaces the contacts and insulates them one from another somewhat as indicated. The body 78 is cuplike and provides a chamber 80 within which is disposed a resilient rubber body 82 engaging a plug portion 84 of a cap member 86, the rubber body acting as a spring or cushion to yieldably project the contacts beyond the plane of the legs 88 of the body 78. The source contact 32 is guided through both the body 78 and plug 84 and connects with a spring 90 disposed in a recess 92 of the latter by which the source contact is yieldingly urged out of the bottom of the body. The pickup instrument 30 is small enough to be conveniently handled by an attendant and is easily slidable over the surface of the metal member that is being examined, and consequently may be easily shifted about while observing the indication given by the galvanometer 66. Each of the seven contacts are provided with individual leads for proper connection into the various circuits. The contacts are each insulated one from the other by appropriate bushings or the like carried by the body member 78 and the location of the contacts 34 to 44 inclusive are so distributed and spaced about the source contact 32 as to satisfy the needs for the particular explorative test to be made. The arrangement of contacts is shown in Figs. 1, 4 and 7 where the symmetrically arranged multiple pickup contacts are suggested as suitable for sheet thickness measurement.

Referring again to Figs. 1, 2 and 7 showing the circuit connections of the pickup instrument, it will be observed that the two contacts 34 and 36 are located on a short radius from the source contact 32, and each join resistors 58 before they are connected with the common lead 64, and that the contacts 38, 40, 42 and 44 are on a greater radius from the source contact 32 and that each connect with a resistance 70 before they join the common conductor 74. These resistances 58 and 70 may all be of the same value, somewhat in the order of 2 or 3 ohms each, and are inserted into the circuit for the purpose of averaging the potentials picked up by the several contacts leading to any one side of the galvanometer. Thus the resistances 70 must all be of the same value so that the potentials picked up by pickups 38, 40, 42, and 44 will all be given equal weight in the averaging process before they join lead 74 to the galvanometer. And similarly the resistances 58 must equal each other so that the potentials picked up by the pickups 34 and 36 will all be given equal weight in the averaging process before they join lead 64 to the galvanometer. The value of 2 or 3 ohms was picked as being very large compared to the differences that could occur in contact resistance as the instrument was moved over a rough or dirty surface.

By analyzing the flow patterns in the sheet being measured it becomes apparent why the pickups are arranged on two different radii from the source 32. In order to analyze the flow of current from source 32 through the sheet being measured, it is necessary to synthesize the flow by a number of flow patterns which add up to the desired flow, yet which can be readily analyzed individually.

Referring first to Figure 9, consider an infinite body of metal 94 with a point source such as 32 located inside at point $c$. The resistance between any two spheres of radius $r_1$ and $r_2$ centered at $c$ is derived as;

$$R = \int_{r_1}^{r_2} \frac{\rho}{4\pi r^2} dr$$

and from $$I = \frac{E}{R}$$

the potential drop from $r_1$ to $r_2$ is $$P = \frac{I\rho}{4\pi}\left(\frac{1}{r_1} - \frac{1}{r_2}\right)$$

where

Figure 5:
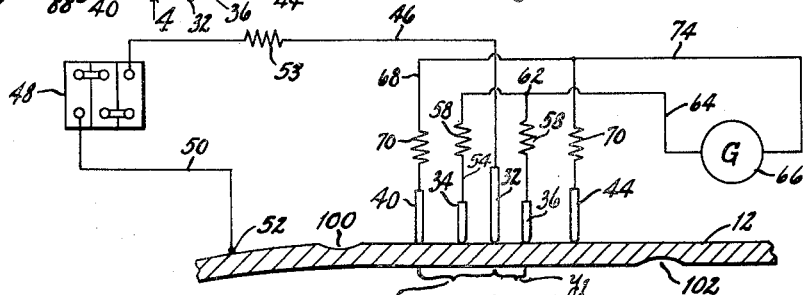
Fig. 5 is an enlarged view of a portion of Fig. 2, showing an infinite body of metal in section with the thickness measuring instrument applied thereto.
Figure 6:
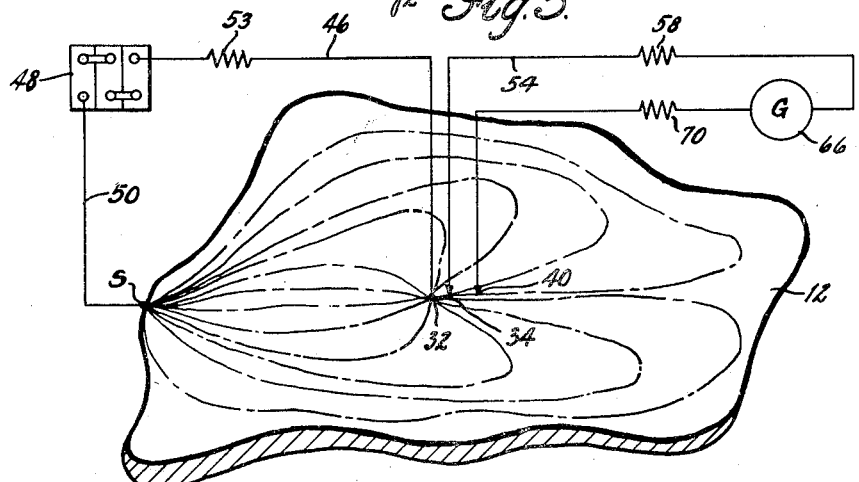
Fig. 6 is a perspective view of an infinite body of metal and superimposed measuring instrument for illustrating the principle of thickness measurement.

R resistance between sphere $r_1$ and sphere $r_2$
$\rho$ resistivity of the metal
I current from the source Thus, when current is passed from any point source within an infinite body of metal the potential drop between any two points in that infinite body can be found as shown above. Now, referring to Figure 10 which is a cross section of the infinite body, it is possible, by use of a number of sources, to produce a flow that conforms to the boundary conditions for an infinite sheet of metal rather than an infinite body of metal. That is, no current can flow perpendicular to the surface of a sheet, and in Figure 10 no current flows perpendicular to the lines $a$ and $b$. Therefore, the potential drop along line $a$ is the same as that along any line radiating from a source on the surface of an infinite sheet. By treating source $s$ and each mirror image source $m$ in the manner shown in the derivation for potential drop, the potential drop between any two points on line $a$, and hence on an infinite sheet, a distance $r_1$, and $r_2$ from the source $s$ in Figure 10 or source 32 in Figures 5, and 6 is;

$$P = \frac{\rho I}{\pi r_1}\left(\frac{1}{2} + \frac{1}{\sqrt{1+\left(\frac{2t}{r_1}\right)^2}} + \cdots\right) - \frac{\rho I}{\pi r_2}\left(\frac{1}{2} + \frac{1}{\sqrt{1+\left(\frac{2t}{r_2}\right)^2}} + \cdots\right)$$

Thus it is shown that on an infinite sheet there is a potential drop between any two radial distances from a current source, and this potential drop depends on the thickness $t$ of the sheet.

This invention adopts the above principle of determining resistance by measuring the voltage drop produced by a known current. A typical example of this type of measurement is in finding the resistance of a heavy wire, where a current is passed through the wire and the voltage drop across a given length is measured. For a given current, material, and length of wire, the resistance and hence the voltage drop measured by a galvanometer depends only upon the cross section area of the wire. A similar circuit is set up for sheet thickness measurement where the galvanometer reading depends only upon thickness of the sheet being measured. There is however, one important difference between measuring the resistance of a wire and the thickness of a sheet. Calculation for the resistance of the wire is based on the fact that the current flows straight through the wire and the current density is uniform over its cross section. In an infinite sheet of metal like a section of a propeller blade such as shown in Figs. 5, 6, and 11, owing to its shape, current will not flow straight along it, and the current density cannot be made constant over the cross section between any two points of contact. Therefore, it is necessary to set up in the blade some current flow pattern that can be analyzed. The pattern chosen is one in which the flow of current substantially streamlines from a single point $s$ see Fig. 6 (called a "source") on the surface of the sheet, and converges to a sink point $m$ remote from this source point. A voltage drop in the sheet caused by this current flow and depending upon the sheet thickness can then be picked up between any two points on the sheet that are at different distances from and close to the "source" of current. Figure 6 shows this basic arrangement on an infinite sheet. The light lines are indicative of paths of current flow.

When the sheet of metal is bounded by a large mass of metal, such as the rib, leading or trailing edge of a blade, the boundary condition is such that no potential gradient can exist along that edge. Such a flow pattern can be set up in an infinite sheet by placing a mirror image sink $m$, as shown in Fig. 11, where the sink $m$ is located back from the edge of the brazed joint or rib R equal to the same distance that the source $s$ is located in front of this joint. Then the potential at any point P on the surface of the sheet, at distance $x$ from the source $s$ and distance $y$ from the mirror image sink $m$ is the sum of the potentials resulting from the source and the sink, or;

$$P = \frac{\rho I}{\pi x}\left(\frac{1}{2} + \frac{1}{\sqrt{1+\left(\frac{2t}{x}\right)^2}} + \cdots\right) - \frac{\rho I}{\pi y}\left(\frac{1}{2} + \frac{1}{\sqrt{1+\left(\frac{2t}{y}\right)^2}} + \cdots\right)$$

That is, mathematically, the flow close to the braze joint can be expressed as the sum of the flow from the source $s$, plus the flow into the mirror image sink $m$ (which is a current source of the opposite polarity located back from the edge of the braze joint the same distance that the source $s$ is in front of this joint). The galvanometer, then, can be considered to read the sum of the voltage drops from the "source" and the "mirror image sink." Now, since the average distance of the four outside pickup prods 38 to 40 from the mirror image sink $m$ is nearly equal to the average distance of the two inside pickup prods 34, 36 from this sink $m$, there is almost no voltage drop picked up from the sink $m$, and the galvanometer reads only the drop in potential from the source $s$. That is how the reading of thickness is made independent of position on the blade.

It will be observed by curve of Fig. 8 that usage of the pickup instrument suggested by Fig. 3 gives a continuous reading of sheet thickness right up to the very edge of the increased section. Also, it should be noted with respect to Fig. 8 that the increased section of metal encountered in moving from an infinite sheet to a position over a rib is very sharply indicated and potential indication immediately arises to the new value.

There are known to be devices for determining plate or sheet thickness that apply an electric current to a section of the metal within the span of pickup prods for the measuring instrument. One such device is illustrated in the U. S. patent to Putnam 1,895,643 issued January 31, 1933. However that instrument may only be used to determine plate thickness of metal at a relatively great distance from an edge or material change of section, unless it is recalibrated for type of measurement in which it is to be used. That is because the location of the source contacts, being located within the span of the pickup contacts, result in the positive mirror image sources being closer to the positive potential pickup, while the negative mirror image sources are correspondingly closer to the negative potential pickup. With a reduction in size of the sheet being examined, (or with the approach from an infinite sheet to a bounding interference mass,) these mirror image sources come closer to (or farther from) their respective potential pickup points, causing larger (or smaller) readings for the same wall thickness, and at points at a considerable distance from the actual change of section.

On the other hand, the method and means by this disclosure may be used to determine sheet thickness, with but a single calibration, and it may be used at any point however close to an edge, fracture, void or change of metal section with negligible error. That is because the average distance from the mirror image sources to the positive potential pickup is equal to the average distance from these sources to the negative potential pickup. It is therefore apparent that the mirror image sources have a negligible effect upon the means and method of this invention.

Referring to Figs. 1, 2 and 5, it will be observed that a real problem is presented for measurement of the thickness of the sheet 12 or the thickness of the member 14, since the restriction 21 offered by the seat for the blade balance cup 24 is too small to permit the insertion and manipulation of a pair of calipers, and the remote end of the blade is practically inaccessible to application of any type of measuring device that necessitates consideration for the inside surface of the member being measured. Further, when the blade is placed in service it is hermetically sealed and stopped by the balance assembly 24 and is from that point on never accessible to inside application of measuring instruments. However, by this disclosure, it is made possible to prospect the entire surface of both members 12 and 14 and determine their characteristics, by moving the pickup device over the outside surface of the member to be tested. Perception of the instrument reading will promptly indicate any change in section of the member being tested, whether it be an outside increase in thickness or an outside depression, such as indicated at 100, or like defects as indicated by 102 in Fig. 5. Assuming that the pickup instrument is being moved from left to right over the member 12, then as the contacts come over the general region of the defect 100 there will be a noticeable change in the instrument reading, with a settling to standard reading again as the defect is passed over and the pickup approaches the position shown in Fig. 5. As the instrument moves further to the right it passes over the defect 102 and gives another indication on its dial. Assuming the pickup instrument is moved still further to the right or such that it approaches and passes over an abrupt section of metal, which might be the mid rib 20 of the blade shown in Fig. 1, then the situation is somewhat as shown in Fig. 8. There, below the structural sectional showing is subtended the curve of values on the instrument dial indicating the character of the section of metal. It will be noted that the curve has a consistent value from the point $a$ to $b$ corresponding to the uniform thickness of the member 12, the curve then rises abruptly to point $c$ indicating the sudden or abrupt change in thickness or increased mass of metal due to the rib 20. From the point $c$ the curve takes up a level branch from $c$ to $d$ indicating the thick member 20.

Thus it is possible to measure the thickness of metal sheets or the like up to the very edge of the sheet and up to the juncture of a seam or greater mass of metal, and it is possible to do so by the act of exploring or prospecting but one side only of the sheet. That is made possible by means of an instrument that physically consists of a centrally located, spring loaded power electrode which passes current to the work to be measured, and a number of spring loaded potential pickups held at a predetermined distance from the power electrode. The potential pickups are arranged in two sets around the power electrode; those of one set being at a small radius from the power electrode, and those of the other set being at a larger radius from the power electrode. The pickups of one set are connected through separate resistances to one side of a current or voltage meter (usually a galvanometer), and the pickups in the other set are connected through separate resistances to the other side of the meter. The work to be measured is connected at a point remote from the measuring instrument to one side of a battery, and the power electrode in the instrument is connected to the other side of the battery. In use this instrument is pressed against the work until all pickups and the power electrode are in good contact with the work. In the design shown, that occurs when the three stops 88 on the bottom of the case are in contact with the surface of the work. The meter is then read or interpreted in terms of thickness of the metal.

While the embodiment of the present invention as herein disclosed, constitutes a preferred form, it is to be understood that other forms might be adopted, all coming within the scope of the claims which follow.

What is claimed is as follows:

1. The method of measuring the thickness of metal consisting in applying an electric current to the metal between a fixed point and a relatively movable point engaging the metal, and then ascertaining the potential value between sets of pickup points on the metal, each set being differentially radially spaced about the movable current conducting point.

2. The method of measuring the thickness of metal consisting of applying an electric current to the metal between a fixed point and a relatively movable point engaging the metal, and thence ascertaining the potential value between sets of other points on the metal, each set having a fixed and predetermined different concentric relation with the movable current carrying point.

3. An apparatus for measuring the thickness of a metal section comprising two spaced current contact members one of which is movable, means for supplying a known electric current value to said current contact members, potential contact members arranged in two circular rows about the movable current contact member, and means connecting together the contact members in one row, and that row of contacts to one side of an indicating instrument, and means connecting together the contact members in the other row, and that row of contacts to the other side of the indicating instrument for measuring the potentials between said rows of potential contacts and means interposed in the connections of the potential contacts for minimizing poor contact engagement.

4. An apparatus for measuring the thickness and irregularities of sheet metal section comprising a current source and two contact members engaging the metal to be measured, one of said current carrying contacts being movable and associated with two serially connected pickup contacts each on opposite sides and radially disposed with respect to the movable current conducting contact and communicating with a galvanometer, a set of four serially connected potential contacts equally circumferentially and radially disposed about the movable current conducting contact and communicating with the other side of the galvanometer whereby the galvanometer reading indicates a potential drop between the average distances of the sets of potential pickups.

5. An apparatus of the character described for exploring the internal structure of metallic bodies and assemblies comprising a source of electric current connected to the structure under test, a pickup instrument having a current contact adapted to movably engage the metallic structure to be explored and connected with the source, a set of serially connected pickup contacts surrounding the current contact and each equally spaced therefrom, a second set of serially connected pickup contacts surrounding the said current contact and each equally spaced therefrom, the spacing of one set of contacts about the current contact being materially greater than the spacing of the other set of contacts, means for measuring the potential of current flow across the sets of pickup contacts and through the spanned metal section of the body being explored, whereby change of spanned section of metal encountered as the pickup instrument is moved over the metal being explored will be detected by a change of readings of the measuring means.

6. The combination set forth in claim 5 wherein, the sets of pickup contacts comprise a pair of contact points equally spaced on diametric sides of the movable contact and a quartet of contact points equally circumferentially and radially spaced on a greater radius about the movable contacts.

7. The combination set forth in claim 5 wherein the two sets of pickup contacts each concentrically arranged around the current contact, when connected with the measuring means give an indication of the potential flowing through the average length of spanned metal between the sets of contacts.

8. The combination set forth in claim 5 wherein the measuring means indicates the potential across the average of different distances of the pickup points from the current contact.

BENJAMIN C. MUZZEY.

REFERENCES CITED

The following references are of record in the file of this patent:

UNITED STATES PATENTS

| Number | Name | Date |
| --- | --- | --- |
| 1,826,961 | Slichter | Oct. 13, 1931 |
| 1,895,643 | Putnam | Jan. 31, 1933 |
| 2,172,778 | Taylor | Sept. 12, 1939 |
| 2,241,623 | Silverman et al. | May 13, 1941 |
| 2,368,119 | De Lanty et al. | Jan. 30, 1945 |